United States Patent
Knappe

[15] 3,649,857
[45] Mar. 14, 1972

[54] MECHANICAL ENERGY STORAGE AND RELEASE DEVICE

[72] Inventor: La Verne F. Knappe, Rochester, Minn.

[73] Assignee: International Business Machines Corporation, Armonk, N.Y.

[22] Filed: July 30, 1970

[21] Appl. No.: 59,400

[52] U.S. Cl. ........................................... 310/8.7, 310/8.1
[51] Int. Cl. ................................................. H01v 7/00
[58] Field of Search ............... 310/8.7, 8.6, 8.3, 8.2, 8.1, 310/8; 197/1 R; 200/159; 101/1, 93 L, DIG. 5, DIG. 13

[56] References Cited

UNITED STATES PATENTS

| | | |
|---|---|---|
| 3,473,466 | 10/1969 | Thayer ........................... 310/8.1 X |
| 3,524,196 | 8/1970 | Church et al. .................... 310/8 |
| 3,109,901 | 11/1963 | Strauss ........................... 200/159 X |
| 3,364,451 | 1/1968 | Paul et al. ....................... 310/8.7 X |

Primary Examiner—J. D. Miller
Assistant Examiner—B. A. Reynolds
Attorney—Hanifin and Jancin and Robert W. Lahtinen

[57] ABSTRACT

A device for high-speed mechanical actuation wherein a mechanical energy storage element is excited at a frequency near a resonant point while being subjected to a set of motion constraints. Mechanical energy is stored in the constrained vibration mode and released to do mechanical work by varying the motion constraints in the proper phase and duration.

9 Claims, 8 Drawing Figures 3,649,857

MECHANICAL ENERGY STORAGE AND RELEASE DEVICE

BACKGROUND OF THE INVENTION

In the present invention, mechanical energy is stored in an energy storage element in a constrained mode of vibration. When a control constraint is momentarily released (or applied), the storage element responds with change in its motion amplitude. Proper timing of the release and application (or application and release) of the motion constraint is essential in obtaining the actuator motion and availability of energy to do useful work. The storage element may take any of a great variety of geometric configurations which can be properly constrained, excited to a desired energy level, and momentarily alter the constraints to provide sufficient stroke and energy availability to perform a machine function.

The storage element is excited to a frequency near a resonant frequency by any transducer means which is suitable for imparting mechanical vibration. In some cases, a frequency greater than resonance is utilized to obtain less sensitivity of the energy level to small variations in frequency.

The illustrated principal embodiment incorporates a beam as the storage element and a print hammer mounted at the midpoint of the beam to move in unison therewith. In addition to the beam energy storage element, the mechanical energy storage and release assembly includes two piezoelectric transducers and a motion amplifying lever. The beam element is mounted between a fixed support and the motion-amplifying lever which is cantilever supported to allow only a translational and a rotational freedom of the lever. The first or excitation transducer excites the beam near a resonant frequency point while the second or control transducer provides an axial motion constraint on the end of the beam controlling the excursion of the beam and print hammer. Upon command the constraint is either removed or reduced permitting the hammer to excursion through a greater amplitude to perform a printing operation or other mechanical work cycle.

It is an object of this invention to provide a high-speed mechanical actuator utilizing a mechanical element to store and release mechanical energy.

DETAILED DESCRIPTION

Figure 1:
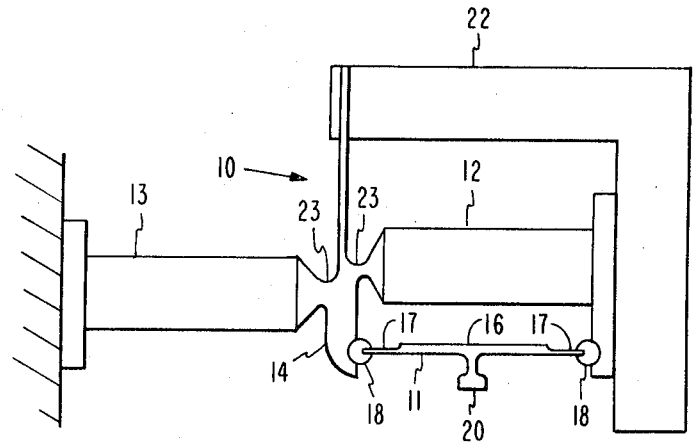
FIG. 1 is a schematic elevation of a strain energy storage and release assembly illustrating the present invention.

As illustrated in FIG. 1 the mechanical energy storage and release assembly 10 has four principle elements, an energy storage element, beam 11; an excitation transducer 12; a control transducer 13; and a motion amplifying lever 14.

Figure 2:
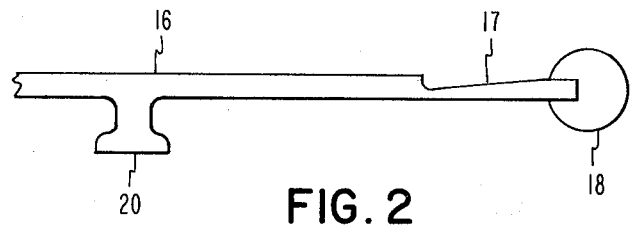
FIG. 2 is an enlarged partial view of the beam element of FIG. 1.

The energy storage element is a beam 11 having a central portion 16 of substantially constant rectangular cross section with tapering reduced cross-section elastic hinge portions 17 adjoining each axial end. The cylindrical ends 18 of the beam are not pivots, but joints to facilitate beam construction and assembly and are fixed during construction with an adhesive to produce a fixed-fixed beam configuration. An axial load is applied eccentrically to the storage element as the elastic hinges are slightly below the neutral axis of the central beam portion 16 as viewed in FIG. 2. The strain energy storage and release assembly 10 being here shown in the environment of a printing device, print hammer 20 is carried by a central portion of the beam storage element 11.

The motion-amplifying lever 14 is constrained by a cantilever beam secured to support 22. Such mounting of lever 14 provides two degrees of lightly constrained freedom (1) translation in the horizontal direction and (2) rotation about an axis perpendicular to the vertical plane through the transducers. The other four degrees are highly constrained. The joints 23 between lever 14 and transducers 12 and 13 are elastic hinges. These elastic hinges are utilized since the transducers must be able to both push and pull through these joints. The small amount of motion transmitted through the joints could be lost during transfer through conventional pivot joints and this type of joint further eliminates the problem of fretting corrosion which common occurs with this type of high-frequency loading.

The transducer piezoelectric material should possess both good motion producing properties and temperature stability. The transducers 12, 13 are each formed of stacked wafers 24 of piezoceramic material such as lead zirconate titanate. The wafers, of common material are stacked in pairs with common confronting positive electrode faces and each pair abutting the adjoining pair through a common negative electrode interface. The positive electrodes are connected at one transducer side to a common positive terminal 26 and the negative electrodes are connected at the opposite transducer side to a common negative electrode terminal 27. Accordingly, the transducer stacked construction is mechanically in parallel. The excitation transducer 12 is mounted above the storage element 11 to reduce the length of the assembly while allowing the use of a motion-transmitting lever which amplifies the transducer motion to the end of the storage element. Control transducer 13 is used to apply and release the axial motion constraint on the storage element. In addition, the preload on the device is applied through the control transducer 13. In operation the energy storage element, beam 11 is excited by excitation transducer 12 to a frequency near a resonant frequency point and constrained through control transducer 13 to vibrate in one of two stability regions permitting an accompanying excursion of the beam center point (and consequently the print hammer 20 which moves in unison therewith). Vibration of the constrained beam in the desired one of two stability regions is effected by eccentrically loading the energy storage beam element. Upon command, control transducer 13 is actuated to release or reduce the axial motion constraint on beam 11 in the proper phase relationship and for a sufficient duration to provide a single extended excursion of the print hammer. The extended excursion of print hammer 20 is the work stroke of the mechanical actuator device.

Figure 4:
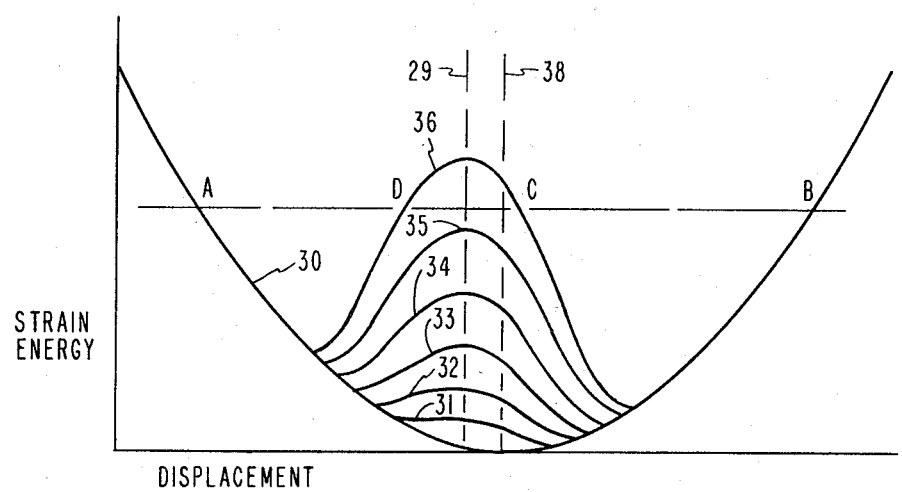
FIG. 4 is a graph plotting strain energy in the beam of FIG. 1 against displacement of the print hammer and showing the effects of axial motion constraint and eccentric loading.
Figure 3:
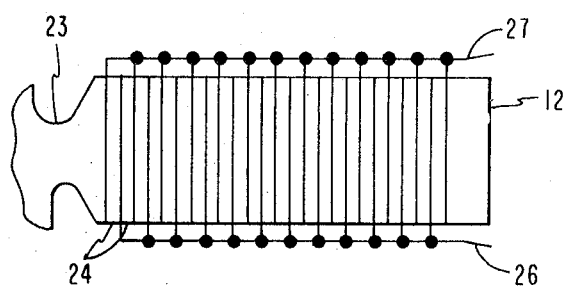
FIG. 3 is an enlarged view of a piezoelectric transducer of FIG. 1.

As seen in the graph of FIG. 4, the strain energy of the beam storage element is plotted against displacement. At a given level of excitation the vibration of the unrestrained beam element 11 followed curve 30 between A and B, the strain energy being zero at the axis of symmetry (where kinetic energy is maximum) and obtaining a maximum at the limits of excursion (A and B) where kinetic energy falls to zero. The family of curves 31 through 36 intermediate points A and B are representative of the effect on strain energy of varying amounts of axial motion constraint on beam 11. The greater the axial constraint, the higher the strain energy curve between points A and B. When as in curve 36, the maximum threshold energy exceeds the operating energy level indicated by A or B, vibration thereafter occurs in one of the stability regions between A and D or between C and B. Axial constraints, applied eccentrically, effectively skew the strain energy curves in the direction of the eccentricity and thereby alters the energy storage and bounds of the stability regions. As seen in FIG. 4, line 38 is the axis of symmetry of curve 30 and line 29 is representative of the skewing effect of the eccentric application of the axial constraint causing such axis to be translated horizontally from the position of axis 38. The amount of eccentricity is designed to assure that the constrained vibration will occur between C and B. Accordingly, during normal constrained vibration the print hammer is displaced between the B and C and upon receipt of the print command, the constraint is released causing the print hammer to excursion between B and A accomplish a work stroke.

Figure 5:
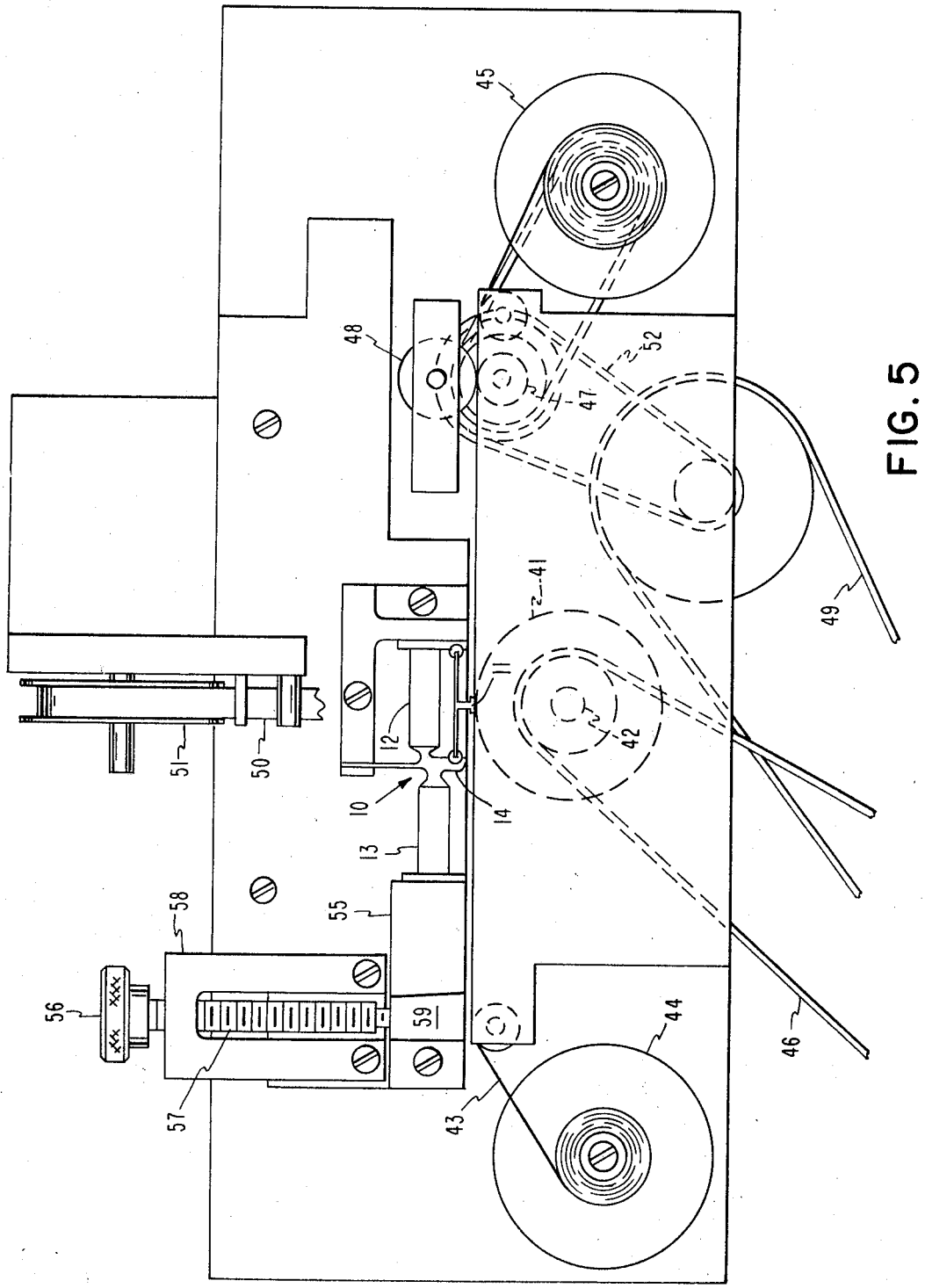
FIG. 5 shows the strain energy storage and release assembly of FIG. 1 in the environment of a printer with portions broken away.

As shown in FIG. 5 the mechanical energy storage and release assembly 10 provides the hammer-actuating portion of a printer. Excitation transducer 12 and control transducer 13 act through lever 14 to impart energy to and control the operating mode of beam 11. Hammer 20 carried by beam 11 confronts the continuously rotating character wheel 41 which is carried by a shaft 42 and driven by a belt 46. The document 43 being printed is shown as a continuous strip of paper running from a supply spool 44, along a path intermediate print hammer 20 and character wheel 41 to take up spool 45. Transport of the paper is controlled by the drive roll 47 and pressure roll 48. Belts 46, 49 and 52 are timing belts which receive power from a common source (not shown) to coordinate the transport of paper 43 with the operation of the printer assembly.

An ink ribbon 50 runs between supply and takeup spools 51 (one of which is shown) and then reverses. For purposes of better illustration the central operating portion of the ribbon 50 has been broken away. This section is guided transversely between document 43 and character wheel 41. Ribbon 50 is driven by a means housed in enclosure 53. As shown in schematic form, block 55 is longitudinally moveable in the direction of the axis of control transducer 13, while knob 36 turns the threaded shaft 57 which is received in a threaded opening in U-shaped retainer 58 to raise and lower wedge block 59 thereby controlling the axial motion preload applied through transducer 13 and lever 14 to beam 11.

Figure 6:
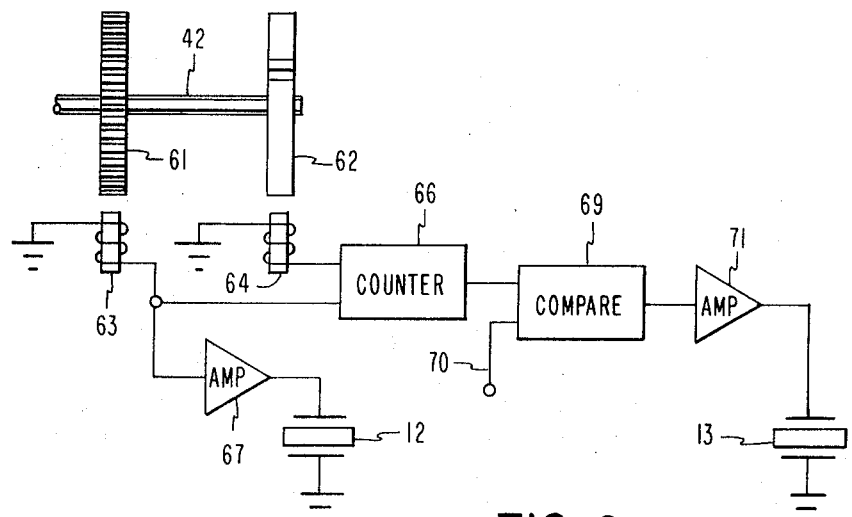
FIG. 6 shows a schematic block diagram of an operating circuit associated with the printer of FIG. 5.

As seen in FIG. 6, a 48 tooth wheel 61 (corresponding to the 48 characters on type wheel 41) and a single tooth wheel 62 are mounted on a common shaft 42 with character wheel 41 and rotated in unison therewith. Emitter pickups 63, 64 in the form of reluctance probes are respectively associated with emitter wheels 61, 62 to generate a pulse as each emitter tooth passes. Each of the emitter pickups 63 and 64 is adjusted peripherally about the respective emitter wheel 61 and 62 to obtain the desired phase relation between the print hammer and the typewheel. The output from emitter pickup 63 is transmitted both to counter 66 and through amplifier 67 to excitation transducer 12. The output of emitter pickup 64 is supplied to counter 66 to identify the home position and initiate the count that identifies the particular character on print wheel 41 which is coming into print position. Compare 69 receives through input 70 the information as to the character to be printed in the form of a number which, upon comparison with the output of counter 66 issues a print command through amplifier 71 to control transducer 13. The print command alters the constraint on storage element 11 to permit an extended excursion of the hammer 20 resulting in a print operation.

In operation, the device as shown in FIG. 5 back prints the document by striking the document on the side opposite that upon which the character is printed. The ribbon 50, typewheel 41 and paper 43 are all continuously driven at a constant speed. All events of the print operation are synchronized with the rotation of shaft 42.

Figure 7:
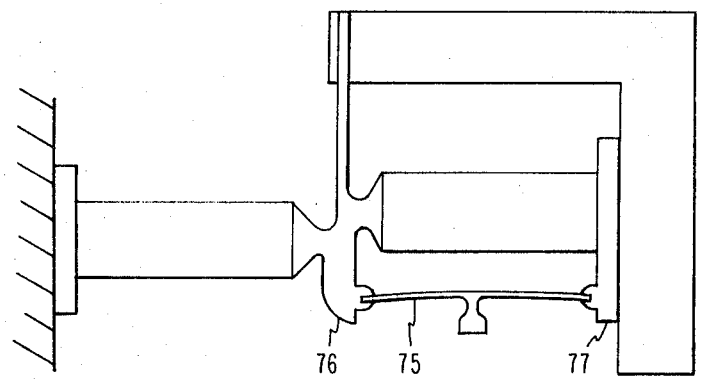
FIG. 7 illustrates an alternate embodiment of the invention using a modified energy storage element and mounting.

An alternative embodiment is shown in FIG. 7 which also uses a beam energy storage element 75. The beam is rigidly connected at one end to motion amplifying lever 76 and at the opposite end to mounting wall 77. At each end the beam is received in a slot inclined upwardly toward the center of the beam. The excitation and control members of the assembly are otherwise the same as utilized in the principal embodiment described above.

Figure 8:
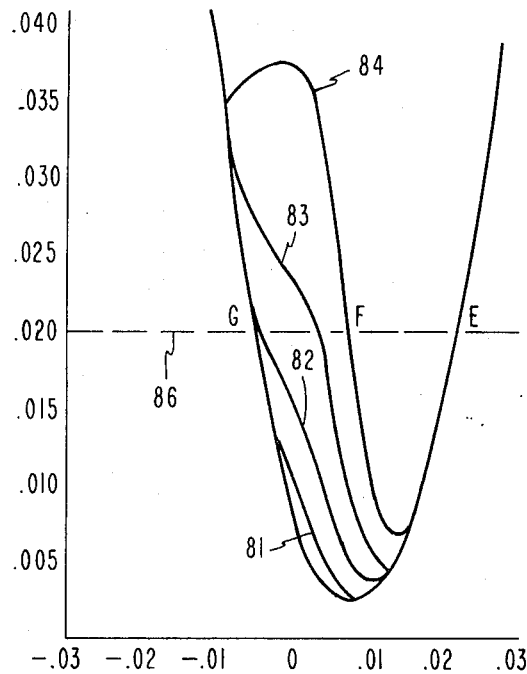
FIG. 8 is a graph plotting strain energy against displacement for the device of FIG. 7 showing the effect of varying axial motion constraint.

As seen in FIG. 8, the family of curves generated by varying axial motion constraints on the beam produces a single stability region in both constrained and in constrained conditions in all but the highest strain energy levels of the curve 84 representing the greatest axial motion constraint. In FIG. 8, the ordinate is representative of the energy level to which the beam is excited, the abscissa represents displacement of the beam midpoint and the various curves 81, 82, 83 and 84 indicate the varying strain energy conditions of the beam when subjected to varying amounts of axial motion constraint. At the energy excitation level indicated by the horizontal line 86 and using a constraint that produces curve 84, the hammer excursions through a displacement between points E and F when constrained and between points E and G when unconstrained. Since beam 74 during vibratory motion is configured as a compound curve, the potential energy level does not fall to zero at the midpoint.

In a specific example of the alternative embodiment using a beam of ½-inch length between supports, with a width of 0.05 inch and 0.015 inch in thickness to which an axial constraint of 0.0012 inches is applied (curve 84), the constrained excursion from E to F is 0.0145 inch and the unconstrained excursion from E to G is 0.0270 inch. Accordingly, the increase in displacement occasioned by alteration of the constraint is 0.0125 inch.

The print speed may be increased or decreased by respectively increasing or decreasing the resonant frequency of the storage element and adjusting the character wheel and document transport speed to correspond to the new operating frequency.

Although in the embodiment shown and described herein, the energy storage and release element has been illustrated in the form of a beam, it will be recognized that many alternative physical configurations would serve in a similar manner. Any element may be used that may be excited to vibrate in one mode when subjected to a particular set of motion constraints and caused to traverse an extended amplitude when the set of constraints are momentarily altered.

What is claimed is:

1. A high-speed mechanical actuating device comprising;
a mechanical energy storage element;
excitation means operatively connected to said energy storage element for imparting mechanical energy as an oscillatory mechanical motion thereto;
constraint means connected to said energy storage element for selectively inducing a first condition of motion constraint and a second condition of altered constraint; and
control means for selectively varying said constraint means between said first and second conditions.

2. The mechanical actuating device of claim 1 wherein said excitation means comprises a transducer connected with said energy storage element to impart motion thereto at a frequency near a resonant frequency of said storage element.

3. The mechanical actuating device of claim 2 wherein said constraint means applies a displacement to said energy storage element causing said energy storage element in said first condition to travel through a first limited excursion and is selectively altered to establish said second condition of constraint permitting said energy storage element to progress through a second extended excursion.

4. The mechanical actuating device of claim 3 wherein said storage element is a beam member and said constraint means eccentrically axially applies a load to said beam to establish said first condition of constrained motion.

5. A high-speed mechanical actuating device comprising;
a mechanical energy storage element;
transducer means for imparting mechanical energy as an oscillatory mechanical motion to said energy storage element and for applying motion constraint to said energy storage element to induce a first condition of constrained motion; and
control means operable to selectively alter the constraint imposed by said transducer means.

6. The mechanical actuating device of claim 5;

wherein said transducer means comprises piezoelectric transducer means supplied with a first voltage to impart mechanical energy to said energy storage element at a frequency near a resonant frequency of said energy storage element; and said control means comprises a second voltage selectively applied to said piezoelectric transducer means.

7. The mechanical actuating device of claim 6 wherein said energy storage element includes a working element moving in unison therewith which excursions a first distance when said energy storage element is subject to said first condition of constrained motion and a second distance when said control means is selectively operated to vary said constraint.

8. The mechanical actuating device of claim 6;
wherein said energy storage element is an elongated beam;
said motion constraint means comprises a first piezoelectric transducer which applies a generally axial compressive force at one axial end of said beam to effect a predetermined axial displacement thereof; and
said control means is effective to vary said axial displacement.

9. The mechanical actuating device of claim 8;
further comprising a lever and a second piezoelectric transducer;
wherein said lever compressively engages said beam and said first and second piezoelectric transducers.

* * * * *